United States Patent Office 3,047,422
Patented July 31, 1962

3,047,422
COATING MATERIAL AND METHOD OF DRYING SAME
Benjamin L. Sites, Elmhurst, and Meyer S. Agruss, Chicago, Ill., assignors to Miehle-Goss-Dexter, Incorporated, a corporation of Delaware
No Drawing. Filed Jan. 9, 1956, Ser. No. 557,865
24 Claims. (Cl. 117—93)

This invention relates to the art of coating materials. It has particular reference to an improved quick-drying vehicle of the drying oil type for various coatings, and to an improved method for rapidly indurating or drying such a vehicle after the coating operation.

A flow-diagram of the method is as follows:

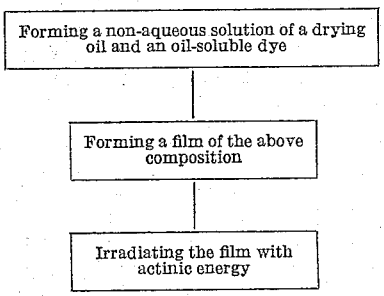

The invention is applicable generally to coating materials utilizing a drying oil type of vehicle, where quick drying of the vehicle is desired. The term coating materials is intended to cover such vehicles or materials which embrace the characteristics of the subject invention and which may have applications in fields other than those specifically mentioned herein, such as, for example, photosensitive resists for use in the Graphic Arts, plugging materials for use in the drilling operations encountered in the petroleum industries, and the like. However, for illustrative purposes, and with no intent to limit its field of use, the invention will be described with particular reference to printing, wherein the coat-forming material is applied by a conventional printing plate.

Printing inks as made heretofore generally consist mainly of a non-aqueous vehicle, namely a drying oil, pigmented to the desired color. For some purposes the printing ink need not contain a pigment, for example, in over-printing. The drying oils commonly used for printing inks, such as tung oil, linseed oil, rape seed oil, and dehydrated castor oil, have by nature a drying rate which is slow compared to the potential operating speeds of printing presses, even when the usual driers (e.g. cobalt) are added to the oils. Particularly with the advent of the higher speed presses and multiple color printing, the avoidance of smudges and off-set on the successive sheets coming from the printing press has presented a serious problem.

While numerous attempts have been made to solve this problem, none of them, as far as we are aware, can be regarded as satisfactory. For example, the use of heat-set inks and steam-set inks, which were developed for this purpose, require the addition of large and expensive accessory equipment to the printing press in order to utilize the full productivity of the press; and the heat or steam tend to impair the dimensional stability of the paper and therefore the quality of the finished printed matter. The use of fine powder sprays or a transparent protective coating over the freshly printed surface (see Costello Patent No. 2,696,168, dated December 7, 1954) also requires considerable accessary equipment and is generally inconvenient.

It has also been proposed to increase the drying rate of printing inks by employing a catalyst or polymerization promoter for speeding up the drying of the vehicle, sometimes in conjunction with heat or radiation of certain light energy. These proposals likewise involve objectionable features which have barred or greatly limited their commercial use. For example, a printing ink containing a diacyl peroxide as the catalyst will undergo skinning and livering even after a short period of storage under ordinary conditions, due to the strong oxidizing effect of this peroxide on the eleostearin of the drying oil, as disclosed in Hooft Patent No. 2,109,774 dated March 1, 1938. Thus, Hooft proposed to apply the diacyl peroxide to the paper separately from the ink, which entails obvious disadvantages in commercial printing. Wendt Patents Nos. 2,453,769 and 2,453,770 disclose printing inks containing certain methane derivatives for promoting polymerization of the drying oil, and irradiation of the printed material with ultra violet light of certain wave lengths; but this expedient is admittedly unsuitable when a heat bodied tung oil is used as the vehicle, and the use of pure eleostearin as suggested by Wendt will obviously result in an unstable product having too short a shelf life for commercial purposes.

The principal object of the present invention is to provide a quick-drying vehicle of the drying oil type and a method for rapidly indurating or drying such a vehicle. Another object is to provide a quick-drying printing ink and printing method which enable the printing press to operate at maximum speed with no smudging or off-setting on the successively printed sheets, and without impairing the dimensional stability of the paper. Further objects are to provide a quick-drying ink containing a polymerization promoter activated by ultra-violet light, or other forms of actinic energy, and to provide an ink of this character which is stable in that it can be stored for a long period of time under ordinary conditions without livering. (While we have referred in the above to sheet-fed presses, it will be understood that the invention is also applicable to web-fed presses.)

By a vehicle of the "drying oil type" we mean a vehicle containing a drying oil binder having a conjugated system of double bonds. By "quick-drying" we mean that when the vehicle containing the ink pigment or other material is applied in a thin film (about 2 to 4 microns in thickness) as in printing, it will dry or set in a matter of seconds; that is, the surface of the film when irradiated up to about 20 seconds with actinic energy, preferably ultra-violet light, becomes sufficiently dry so that in the case of a printing ink, for example, it will not off-set on succeeding sheets coming from the press. However, the drying action does not stop after the ultra-violet light or activating energy is removed. On the contrary, in the practice of the present invention we have found that within a period of up to about 30 seconds after such removal of the activating energy, the polymerization or drying action has penetrated the entire film to provide a film which is hard throughout. On the other hand, a film of the same thickness consisting of the vehicle alone, when irradiated for the same period of time with the ultra-violet light, will dry through the entire depth of the film in this short period of irradiation, there being no inert pigment in the vehicle to slow down the polymerization rate.

The quick-drying vehicle of the present invention is non-aqueous and consists essentially of a drying oil binder having a conjugated system of double bonds, and any dye which is soluble in the binder and which is capable of being activated by irradiation with actinic energy, such as ultra-violet light, to provide free radicals and thereby initiate a rapid polymerization of the binder. The ultra-violet light thus constitutes an activating means for triggering a reaction in which the dye readily absorbs the irradiated light energy so that free radicals for the polymerization are formed directly with the dye. Examples of dyes suitable for this purpose are those of the phthalein, acridine, triphenylmethane, carbocyanine and oxazine classes. Specific dyes found to be particularly suitable are acriflavine, fluorescein, rose bengal, eosine, phloxine, erythrosine, rhodamine B, saffranine, riboflavine, malachite green, crystal violet, pinacyanole and brilliant cresyl blue. Combinations of different dyes can also be used. The amount of the dye constituent used in the vehicle can be varied over a wide range. We have found that good results are obtained when the dye is present in an amount of about 0.04% by weight of the binder.

It will be apparent from the foregoing that the dye constitutes a photopolymerization catalyst for the drying oil binder.

The binder may be any of the drying oils commonly used in printing inks and containing conjugated unsaturation, or a mixture of two or more such oils. Bodied tung oil is preferred as the conjugatedly unsaturated drying oil. As indicated above, however, the binder may comprise a conjugatedly unsaturated drying oil, such as, tung oil and a portion of non-conjugatedly unsaturated drying oil. If the binder contains less than about 30% conjugated unsaturation, the vehicle will not undergo the rapid and complete chain reaction which is preferred for the purpose of the invention.

In one embodiment of the invention, the photopolymerization catalyst for the binder comprises the dye as well as a monomer and a reducing agent. The dye, monomer and reducing agent are soluble in the binder and serve to promote a rapid polymerization thereof when a film or coating of the vehicle is irradiated with ultra-violet light. The latter thus constitutes an activating means for triggering a reaction in which the dye readily absorbs ultra-violet light energy so that the free radicals are formed directly with the dye, which in turn forms free radicals with the monomer and the binder of the vehicle. This provides a rapid chain reaction which completes the polymerization or drying of the vehicle in a few seconds. The reducing agent serves to offset side reactions during the formation and rearrangement of the free radicals, which side reactions would otherwise tend to oxidize the dye molecules and terminate the chain reaction before the vehicle is fully polymerized.

Monomers found suitable for use in the new vehicle include acrylamide, methyl methacrylate, acrylonitrile, styrene, vinyl acetate, vinyl chloride and methyl acrylate. Any reducing agent may be used, such as, for example, stannous chloride, ascorbic acid, phenylhydrazine, ferrous salts, chromous salts, hydroxylamine, thiourea and hydrazine sulfate.

The proportions of the monomer, the dye and the reducing agent in the polymerization promoter, and the proportion of the promoter in the binder, may be varied over wide ranges. In general, the reducing agent will constitute a small fraction by weight of the dye, and these two components will constitute less than 1.0% by weight of the promoter; and the drying oil binder will be present in a greater quantity by weight than the promoter.

The polymerization reaction according to the invention requires no ionization to produce free radicals, nor does it appear to depend upon a pH control of the reactants. There is no apparent change in the color of the dye during the reaction, and photo-desensitizers do not exhibit any inhibiting effect on the reaction.

The mechanism of the reaction, when the monomer and reducing agent are combined with the dye, is believed to be as follows: When the dye molecule absorbs the energy of the ultra-violet light, which occurs practically instantaneously, the orbital electrons of the double-bonded carbon atoms are energized to such an extent that the double bond is substantially open. The resulting unstable dye molecule stabilizes itself by picking up two monomer molecules and giving up its excess energy to them while absorbing an electron. The two monomer molecules thus combine and form another free radical in order to propagate their polymerization. Also, the highly activated free radical of the dye molecule may pick up two molecules of the drying oil binder and cause them to polymerize, and the free radicals of the monomer molecules may polymerize the binder.

The ultra-violet light used to trigger the polymerization reaction is preferably the full spectrum of ultra-violet, including 1800 A. to 4000 A., as we have found that isolated bands of the spectrum do not provide as rapid a polymerization as the full spectrum. An example of such a light source is a high pressure electronic discharge quartz mercury arc tube having an active length of about 1½ inches and drawing about 100 watts, the ultra-violet intensity of radiations of 3130 A. and shorter, measured at 20 inches distance, being over 250 microwatts per square centimeter.

Neither white light nor infra-red radiation will initiate the polymerization reaction at a speed approaching that obtainable with ultra-violet radiation.

In its preferred form, the vehicle comprises also a peroxide catalyst. The peroxide has been found to increase the rate of the polymerization reaction when activated by the ultra-violet light. The latter forms free radicals with the dye or the dye-reducing agent-monomer combination and also forms free radicals with the peroxide. When the peroxide is used with the dye-reducing agent-monomer combination, two chain reaction polymerizations take place involving (1) the liquid monomer and (2) the drying oil binder. Cross linking of these two simultaneous polymerizations gives a hard film. The preferred peroxides are benzoyl peroxide, tertiary-butyl perbenzoate, and methyl ethyl ketone peroxide. Other peroxides found to be suitable are lauroyl peroxide and tertiary-butyl hydroperoxide. The optimum quantity of the peroxide catalyst is about 2% by weight of the binder, although the proportion is not critical.

The presence of a peroxide in the vehicle, even without the dye, greatly accelerates the polymerization of the binder under the action of the ultra-violet light. In fact, the peroxide appears to have a stronger effect than the dye-reducing agent-monomer combination in promoting the polymerization reaction in the presence of such light. We have discovered, however, that the dye-reducing agent-monomer combination counteracts the strong tendency of the peroxide to cause livering of the vehicle and thereby impair its shelf life. In other words, the dye-reducing agent-monomer combination acts as an anti-livering agent as well as a polymerization catalyst responsive to ultra-violet radiation, thereby enabling the formulation of quick-drying inks having a long shelf life. A vehicle containing this combination as a catalyst, with or without the peroxide, can be allowed to stand for several months without skinning or livering.

The method of the invention comprises essentially the rapid induration of the drying oil binder by (1) forming a non-aqueous solution of the binder and a soluble photopolymerization catalyst including the dye with or without the monomer and reducing agent, (2) forming a film of the resulting vehicle, and (3) irradiating the film with actinic energy (preferably ultra-violet light) adapted to activate the catalyst by forming free radicals directly with the dye.

In the preferred practice of the invention, the vehicle containing a pigment in the desired proportion is applied in any suitable manner in a film to the material to be coated such as a paper, and is then irradiated with the ultra-violet light to trigger the polymerization reaction.

In the case of printing, the printing ink comprises the vehicle and if desired pigment suspended in the vehicle. The ink is applied in the usual manner by the printing press, and the source of ultra-violet light is positioned to irradiate the printed surfaces of the successive sheets coming from the press.

In the following examples, a few drops of the vehicle in each case were placed upon a glass microscope slide and spread out to a thin film with an accurately honed steel depth gauge, so that the thickness of the various films was substantially uniform for comparative purposes; and in each case, the thin film on glass was placed one inch away from the ultra-violet source previously described and timed for complete polymerization to take place. All percentages in the various formulae are on a weight basis.

(I) Bodied tung oil by itself in a thin film on glass required 95 seconds of irradiation with the ultra-violet light before polymerizating to a hard film.

(II) Formula No. 1:
 80.00% bodied tung oil
 16.62% methyl methacrylate (solvent and monomer)
 1.66% acrylamide (monomer)
 1.66% methyl alcohol (solvent for acrylamide)
 0.06% acriflavine (a basic dye)
 0.001% stannous chloride (reducing agent)

A thin film on glass of Formula No. 1 required 5 seconds irradiation by the ultraviolet light before polymerizing to a hard film.

(III) Formula No. 2:
 78.40% bodied tung oil
 1.60% tertiary-butyl perbenzoate (a peroxide)
 16.62% methyl methacrylate
 1.66% acrylamide
 1.66% methanol
 0.06% acriflavine
 0.001% stannous chloride A thin film on glass of Formula No. 2 required one second irradiation by the ultraviolet light to form a hard film.

(IV) Formula No. 3:
 40.833% bodied tung oil
 40.833% bodied dehydrated castor oil
 1.666% benzoyl peroxide
 13.850% methyl methacrylate
 1.385% acrylamide
 1.385% methanol
 0.050% acriflavine
 0.0008% stannous chloride A thin film on glass of Formula No. 3 required two seconds irradiation by the ultraviolet light to form a hard film.

(V) Formula No. 4:
 30.105% bodied tung oil
 20.280% dehydrated linseed oil
 31.281% styrenated castor oil
 1.666% tertiary-butyl perbenzoate
 13.850% Methyl methacrylate
 1.385% acrylamide
 1.385% methanol
 0.050% acriflavine
 0.0008% stannous chloride A thin film on glass of Formula No. 4 required 2 seconds irradiation by the ultraviolet light to form a hard film.

(VI) Formula No. 5:
 77.500% bodied tung oil
 7.386% acrylamide
 11.817% ethylene glycol
 0.096% acriflavine
 0.001% stannous chloride
 1.600% benzoyl peroxide
 1.600% tertiary butyl perbenzoate A thin film on glass of Formula No. 5 required 3 seconds irradiation by the ultraviolet light to form a hard matte film.

In Formula No. 1, the methyl methacrylate and the methyl alcohol act as a solvent for the acrylamide. A better solvent for the acrylamide is ethylene glycol, which is used in Formula No. 5, or a polyethylene glycol.

Certain monomers, such as N-vinyl pyrrolidone and acrylamide, are known to be reducing agents in themselves. When such a monomer is present in the vehicle, it is not essential, of course, to provide an additional reducing agent, as such a monomer is in effect a monomer and a reducing agent. Thus, the foregoing formulae, by reason of their inclusion of acrylamide, would contain a monomer and a reducing agent even if the stannous chloride were omitted.

The vehicles described in the foregoing formulae were made into inks to observe their action on a printing press as well as their transfer to paper. Each vehicle was mixed with a blue or red pigment, the amount of pigment varying somewhat according to the wetting power of the vehicle. These inks were used on a Lithoprint press, using regular lithographic paper in some instances and enameled stock in other instances. Promptly after printing, the paper was irradiated with ultra-violet light for several seconds. Immediately after this irradiation, no offsetting would occur, and it was noticed that several minutes after the irradiation the printed matter could not be smeared by a finger using pressure. It was further noted that these inks set up faster to complete hardness on the enameled stock than similar inks containing only a peroxide as the photopolymerization catalyst, although the latter inks set up somewhat faster on the lithographic paper.

The following are examples of printing inks made according to the invention. In each case, the ink was applied by a Lithoprint press to paper of standard stock, and the printed sheet was promptly irradiated by ultra-violet light for two to three seconds. The inks gave satisfactory printing on the sheets and would not off-set upon completion of the irradiation. The non-irradiated printing would off-set for six to eight hours after printing.

Formula No. 6:
 49.5% bodied tung oil
 10.3% methyl methacrylate
 1.0% acrylamide
 1.0% methanol
 0.03% acriflavine
 0.001% stannous chloride
 2.0% tertiary butyl perbenzoate
 0.6% benzoyl peroxide
 10.5% red toner
 25.0% aluminum hydroxide Formula No. 7:
 22.5% bodied tung oil
 22.5% dehydrated castor oil
 5.0% methyl methacrylate
 0.5% acrylamide
 0.5% methanol
 0.02% acriflavine
 0.003% stannous chloride
 2.3% tertiary butyl perbenzoate
 0.6% benzoyl peroxide
 23.5% blue toner
 15.0% aluminum hydroxide
 7.5% magnesium carbonate Formula No. 8:
 32.7% bodied tung oil
 16.4% dehydrated linseed oil
 5.5% methyl methacrylate
 0.55% acrylamide
 0.55% methanol
 0.02% acriflavine
 0.0003% stannous chloride
 4.1% tertiary butyl perbenzoate
 0.8% benzoyl peroxide
 6.5% blue toner
 16.4% aluminum hydroxide
 16.4% magnesium carbonate It was also determined that when a small amount of a cross-linking agent, such as divinyl benzene, is included in the vehicle, the hard film formed by irradiation with the whole spectrum of ultra-violet light is clear. A thin film of a vehicle having the following formula was formed and irradiated in the manner described in connection with the preceding examples and polymerized to a hard, clear film in ½ second of irradiation, and no skinning or livering of the vehicle was observed.

Formula No. 9:

77.4% bodied tung oil
11.4% methyl methacrylate
1.8% divinyl benzene
2.5% acrylamide
2.5% methanol
0.06% acriflavine
0.001% stannous chloride
1.8% benzoyl peroxide
2.6% cinnamoyl chloride None of the vehicles or inks of the foregoing formulae showed skinning or livering after storage under ordinary conditions.

Other formulae exemplifying the invention are as follows, the figure at the right of each formula indicating the number of seconds of the ultra-violet irradiation required to provide a hard matte film:

Seconds

Formula No. 10:

81.83% bodied tung oil
16.36% styrene
0.16% riboflavin
1.64% ascorbic acid

9

Formula No. 11:

79.23% bodied tung oil
15.84% styrene
0.16% riboflavin
1.58% ascorbic acid
3.16% t-butyl perbenzoate

3

Formula No. 12:

81.83% bodied tung oil
16.36% styrene
0.16% rhodamine B
1.64% ascorbic acid

6

Formula No. 13:

79.23% bodied tung oil
15.84% styrene
0.16% rhodamine B
1.58% ascorbic acid
3.16% t-butyl perbenzoate

2

Formula No. 14:

83.19% bodied tung oil
16.63% N-vinyl pyrrolidone
0.17% rhodamine B

7

Formula No. 15:

80.51% bodied tung oil
16.10% N-vinyl pyrrolidone
0.16% rhodamine B
3.20% t-butyl perbenzoate

2

Formula No. 16:

81.83% bodied tung oil
16.36% methyl methacrylate
0.16% rhodamine B
1.64% ascorbic acid

6

Formula No. 17:

79.23% bodied tung oil
15.84% methyl methacrylate
0.16% rhodamine B
1.58% ascorbic acid
3.16% t-butyl perbenzoate

2

Formula No. 18:

81.83% bodied tung oil
16.36% acrylonitrile
0.16% rhodamine B
1.64% ascorbic acid

6

Formula No. 19:

79.23% bodied tung oil
15.84% acrylonitrile
0.16% rhodamine B
1.58% ascorbic acid
3.16% t-butyl perbenzoate

2

Formula No. 20:

97.5% bodied tung oil
0.5% benzoin
2.0% acrylamide
0.003% riboflavin

5

Formula No. 21:

80% bodied tung oil
10% acrylamide
10% ethylene glycol
0.004% riboflavin

7

Formula No. 22:

77.0% bodied tung oil
1.9% benzoyl peroxide
1.9% 5-butyl perbenzoate
9.6% acrylamide
9.6% ethylene glycol
0.004% riboflavin 1.5

As previously mentioned, the monomer-dye-reducing agent combination counteracts the strong tendency of the peroxide to cause livering of the vehicle and thereby impair its shelf life. It will be apparent that this combination is distinctly different from the anti-skinning agents, anti-oxidants and inhibitors commonly used, which are highly substituted phenols. According to the present invention, the vehicle will have a good shelf life even if it contains a peroxide, because of its inclusion of the above mentioned materials which readily absorb ultra-violet light, readily form free radicals in a non-aqueous solution when activated by ultra-violet light, and are oil soluble. Thus, these materials are not merely diluents, such as anti-skinning agents, anti-oxidants and inhibitors, but take part in the overall action for quick-drying of the vehicle when activated by the ultra-violet light. In addition, they add greatly to the shelf life and press stability of the vehicle.

Thin films of the vehicle given in Formula No. 2 were subjected to the alpha rays from six hundred milligrams radium per square inch area of vehicle film. The vehicle polymerized and dried hard after one second irradiation.

Examples of the use of the dye without the monomer and reducing agent are shown in the following table. In each case, the vehicle was made up of tung oil containing 0.04% by weight of the dye dissolved in anhydrous methanol; and the formation of the film and the irradiation thereof were as described in connection with the previous examples. The figure at the right of each dye designation indicates the number of seconds of the ultra-violet irradiation required to dry the film completely.

| Dye | Class | 0.04% Dye in tung oil, Seconds to Dry |
|---|---|---|
| Rhodamine B | Phthalein | 7 |
| Acriflavine | Acridine | 9 |
| Malachite Green | Triphenylmethane | 9 |
| Crystal Violet | do | 9 |
| Acridine | Acridine | 10 |
| Pineacyanole | Carbocyanine | 10 |
| Rose Bengal | Phthalein | 10 |
| Erythrosine B | do | 12 |
| Brilliant Cresyl Blue | Oxazine | 14 |

We claim:

1. In the art of printing a sheet, the improvement which comprises forming a printing ink comprising a non-aqueous solution of a drying oil binder having a conjugated system of double bonds, and an oil-soluble dye capable of initiating the polymerization of the binder upon irradiation with actinic energy, said ink being free of any substance rendering it polymerizable by visible light and having a viscosity that enables it to be applied as a thin coating, printing the sheet with said ink, and irradiating the printed surface of the sheet with actinic energy, thereby rapidly indurating the ink.

2. The improvement according to claim 1, in which said binder has a conjugated unsaturation of at least about 30%.

3. The improvement according to claim 1, in which said solution also includes an organic peroxide.

4. The improvement according to claim 1, in which said solution also includes divinyl benzene.

5. The improvement according to claim 1, in which the printed surface of the sheet is irradiated with ultraviolet light.

6. The process of claim 2 wherein a pigment is suspended in the drying oil.

7. The improvement according to claim 1, in which said solution also includes a vinyl type monomer and a reducing agent.

8. The improvement according to claim 7, wherein the binder is a bodied tung oil.

9. The improvement according to claim 1, in which said solution also includes an organic peroxides, a vinyl type monomer and a reducing agent.

10. The improvement according to claim 9, wherein the binder is a bodied tung oil.

11. The improvement according to claim 1, in which said solution also includes a cross-linking agent.

12. The improvement according to claim 11, wherein the binder is a bodied tung oil.

13. A stable non-aqueous quick-drying printing ink, which comprises a drying oil binder having a conjugated system of double bonds, and an oil-soluble dye capable of initiating the polymerization of the printing ink upon irradiation with actinic energy, said drying oil and oil-soluble dye being present in a substantially unreacted form, said ink being free of any substance rendering it polymerizable by visible light and said printing ink being adapted to quickly dry when exposed in a thin film to actinic energy.

14. A printing ink according to claim 13, in which the binder has a conjugated unsaturation of at least about 30%.

15. A printing ink according to claim 13, comprising also an organic peroxide.

16. A quick-drying printing ink according to claim 13 comprising also divinyl benzene.

17. A printing ink according to claim 13, in which the binder is a bodied tung oil.

18. The composition of claim 13 wherein a pigment is suspended in the drying oil.

19. A printing ink according to claim 13, comprising also a vinyl type monomer and a reducing agent in solution with the binder.

20. A printing ink according to claim 19, is which the binder is a bodied tung oil.

21. A printing ink according to claim 13, comprising also an organic peroxide, a vinyl type monomer and a reducing agent in solution with the binder.

22. A printing ink according to claim 21, in which the binder is a bodied tung oil.

23. A quick-drying printing ink according to claim 13 comprising also a cross-linking agent.

24. A printing ink according to claim 23, wherein the binder is a bodied tung oil.

References Cited in the file of this patent

UNITED STATES PATENTS

| | | |
|---|---|---|
| 1,574,357 | Beebe et al. | Feb. 23, 1926 |
| 1,587,274 | Beebe et al. | June 1, 1926 |
| 1,818,073 | Long | Aug. 11, 1931 |
| 2,032,554 | Hooft | Mar. 13, 1936 |
| 2,109,774 | Hooft | Mar. 1, 1938 |
| 2,180,342 | Auer | Nov. 21, 1939 |
| 2,524,862 | White | Oct. 10, 1950 |
| 2,548,685 | Sachs et al. | Apr. 10, 1951 |
| 2,670,483 | Brophy | Mar. 2, 1954 |
| 2,690,966 | Minsk et al. | Oct. 5, 1954 |
| 2,747,997 | Smith et al. | May 29, 1956 |
| 2,760,863 | Plambeck | Aug. 28, 1956 |
| 2,842,474 | Pratt | July 8, 1958 |
| 2,955,958 | Brown | Oct. 11, 1960 |

FOREIGN PATENTS

| | | |
|---|---|---|
| 566,795 | Great Britain | Jan. 15, 1945 |
| 618,181 | Great Britain | Feb. 17, 1949 |

OTHER REFERENCES

Oster: Dye-sensitized Photopolymerization, Nature, Feb. 13, 1954, vol. 173, No. 4398, pp. 300 and 301.

UNITED STATES PATENT OFFICE
CERTIFICATE OF CORRECTION

Patent No. 3,047,422                          July 31, 1962

Benjamin L. Sites et al.

It is hereby certified that error appears in the above numbered patent requiring correction and that the said Letters Patent should read as corrected below.

Column 5, line 10, for "polymerizating" read -- polymerizing --; column 9, line 37, for the claim reference numeral "2" read -- 1 --; line 45, for "peroxides" read -- peroxide --; column 10, line 21, for "is" read -- in --.

Signed and sealed this 20th day of November 1962.

(SEAL)
Attest:

ERNEST W. SWIDER
Attesting Officer

DAVID L. LADD
Commissioner of Patents